Jan. 21, 1958 N. W. HANCOCK ET AL 2,820,952

HIGH POWER LADDER NETWORK ATTENUATOR FOR FREQUENCIES FROM ZERO TO OVER ONE THOUSAND MEGACYCLES

Filed Dec. 29, 1953 3 Sheets-Sheet 1

INVENTOR.
NOEL W. HANCOCK
EDWIN N. PHILLIPS
BY
Marvin Moody
ATTORNEY

INVENTOR.
NOEL W. HANCOCK
EDWIN N. PHILLIPS
BY
Marvin Moody
ATTORNEY

INVENTOR.
NOEL W. HANCOCK
EDWIN N. PHILLIPS
BY Morris Moody
ATTORNEY

United States Patent Office 2,820,952

Patented Jan. 21, 1958

2,820,952

HIGH POWER LADDER NETWORK ATTENUATOR FOR FREQUENCIES FROM ZERO TO OVER ONE THOUSAND MEGACYCLES

Noel W. Hancock and Edwin N. Phillips, Cedar Rapids, Iowa, assignors to Collins Radio Company, Cedar Rapids, Iowa, a corporation of Iowa Application December 29, 1953, Serial No. 400,928

9 Claims. (Cl. 333—81)

This invention relates generally to high power attenuators and particularly to an attenuator which dissipates very large amounts of power and provides a matched impedance over a frequency range from direct current through the ultra high frequencies.

A ladder network attenuator may be defined as a series of T or pi resistor sections that are connected in tandem. The input and output impedance of each section must equal the characteristic impedance of an input power transmission line in order for the network to receive all incoming power.

Conventional T or pi ladder networks have a constant exponential attenuation for all sections. They are often used as voltage attenuators; but they will not operate as large power attenuators at high frequencies. We have discovered a way to construct ladder networks for use as high power attenuators that will operate over a frequency range from the ultra high frequencies down to direct current.

If a conventional ladder network has an infinite number of sections and each section can dissipate a maximum of 80 watts, the infinite network cannot accept more than 800 watts input power without overloading the first section. The conventional network is therefore limited because of uneven power dissipation among its sections. Its first section must dissipate a larger amount of power than any subsequent section.

This invention discloses a ladder network which avoids the power limitations of conventional ladder attenuators. A model of this invention used 125 eighty watt sections mounted in a two and three quarter inch diameter pipe twelve feet long to dissipate 10,000 watts. The invention uniformly dissipates power in all sections and the maximum input power is determined by the total number of sections rather than the dissipation rating of the first section.

It is therefore the principal object of this invention to provide a ladder network that can dissipate extremely large amounts of power and yet can be built within the extreme physical limitations required by ultra high frequencies.

It is also an object of this invention to provide a high power attenuator that is useful over an extremely broad band of frequencies covering the range from direct current through ultra high frequency.

It is another object of this invention to provide a high power attenuator that provides a very good impedance match over the frequency range from zero to approximately 2,000 megacycles.

It is a further object of this invention to provide a high power attenuator which may be constructed from relatively small, common and inexpensive components.

It is a still further object of this invention to provide a high power attenuator which may be directly connected to a coaxial line of the same surge impedance.

This invention not only provides a ladder network which allows equal power dissipation in each section but also allows equal power dissipation between series and shunt resistors. Maximum efficiency for power dissipation is thereby obtained.

Basically, this invention varies the attenuation per network section or pad in a manner which maintains uniform power dissipation and yet does not disturb the required input and output characteristic impedance of any section. The ladder network in this invention may comprise T or pi connected pads.

Further objects, advantages and features will be apparent to a person skilled in the art upon further study of the specification and drawings, in which.

Figure 1:
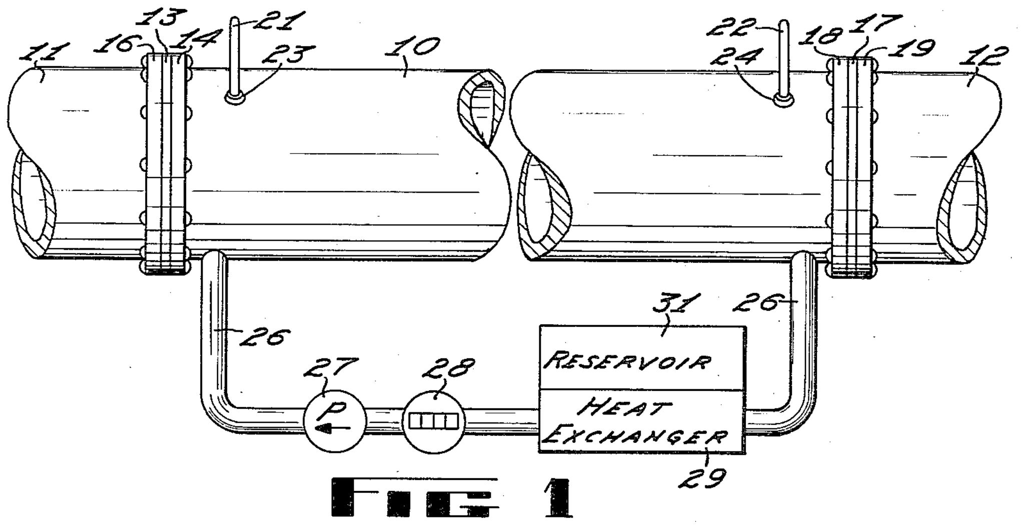
Figure 1 is an elevational view of an embodiment of the invention.
Figure 2:
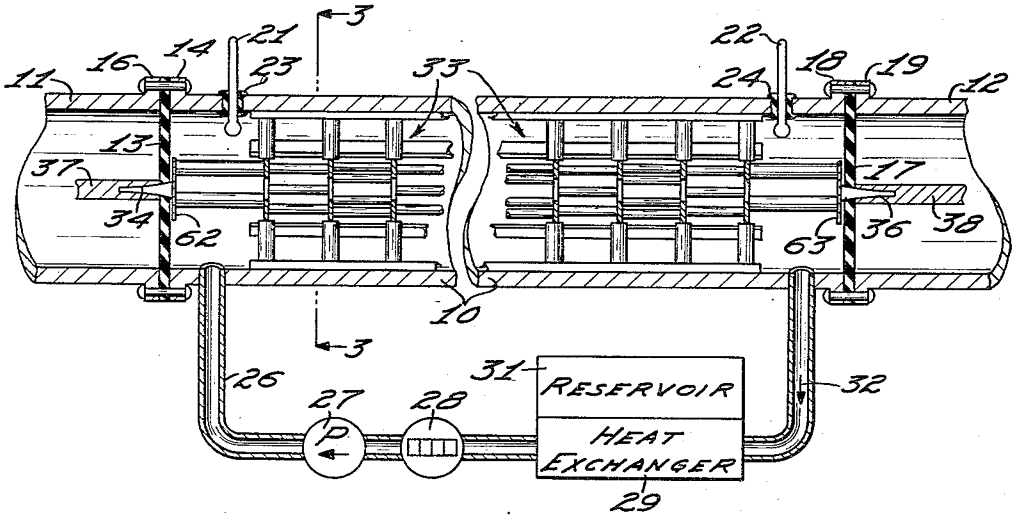
Figure 2 is an axial sectional view of the embodiment in Figure 1.

The chosen embodiment shown in Figures 1 and 2 uses a coaxial network configuration that is enclosed in a metal casing 10 coupled between an input coaxial cable 11 and an output coaxial cable 12. Casing 10 provides both an outer conductor for the ladder network and a fluid-tight container.

Thin sheets of insulating material at the ends of casing 10 provide fluid-tight supports for the network. Sheet 13 is bolted between the casing flange 14 and the input cable flange 16; and sheet 17 is bolted between the other casing flange 18 and the output cable flange 19.

A pair of thermometers 21 and 22 may be inserted through grommets 23 and 24, respectively, mounted through the casing wall near flanges 14 and 18.

A pipe 26 has opposite ends connected to wall 10 adjacent flanges 14 and 18 and is connected to a pump 27, a rate of flow meter 28, and a heat exchanger 29.

A reservoir 31 is connected to heat exchanger 29 and stores excess fluid 32 that is used as a coolant for the resistor network. Fluid 32 may be carbon tetrachloride or any suitable coolant fluid.

Figure 2 is an axial cross section of Figure 1 and also shows a cross section of a network 33 enclosed by casing 10. Input and output connectors 34 and 36 are respectively fixed to opposite ends of network 33 and extend through insulator sheets 13 and 17 in a fluid seal. Connector 34 couples with the inner conductor 37; and connector 36 couples with the inner conductor 38.

Figures 3, 4:
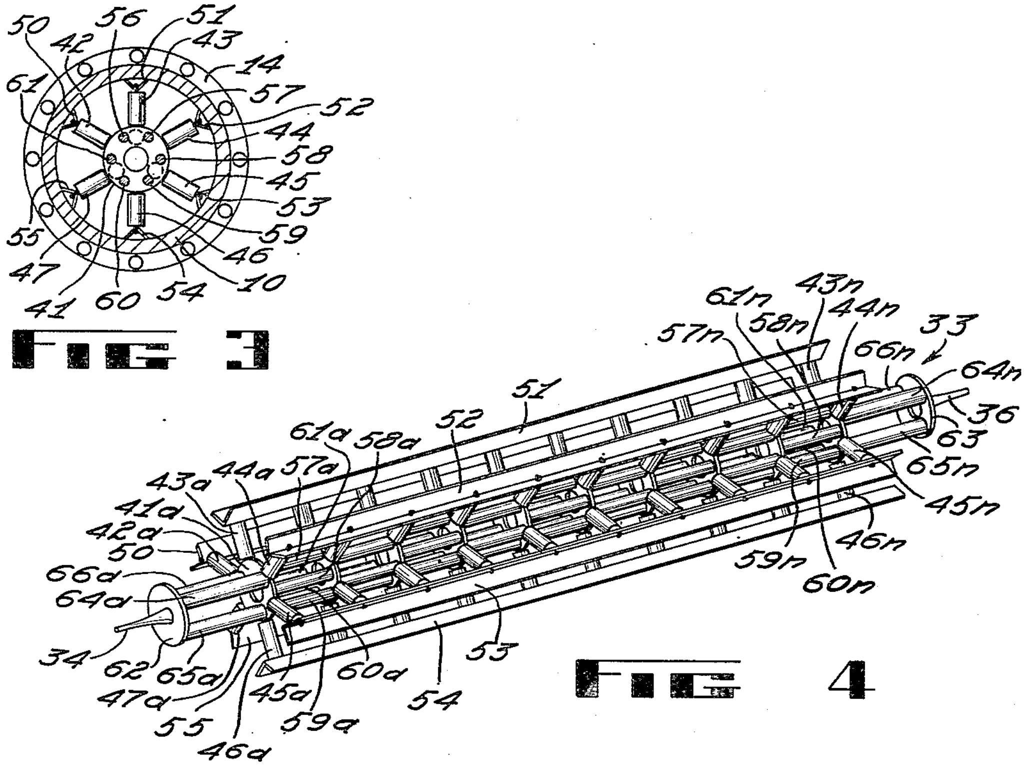
Figure 3 is a transverse sectional view of the embodiment taken across section 3—3 in Figure 2.
Figure 4 is a perspective view of the resistor network in this embodiment.

Figure 4 shows a perspective view of ladder network 33. It has a number of intermediate annular plates 41 of conducting material that provide support for the resistor components in network 33. This embodiment illustrates six shunt resistors, 42, 43, 44, 45, 46 and 47 connected at one end to each plate 41 in a radial and symmetrical manner. Their opposite ends are connected to the bottoms of six V-shaped rods 50, 51, 52, 53, 54 and 55, respectively, that are made of springy conducting material. Six series resistors 56, 57, 58, 59, 60 and 61 are connected in parallel between each pair of adjacent intermediate plates 41. Network 33 is terminated at each end by circular end plates 62 and 63. There are three series resistors 64, 65 and 66 connected in parallel between each end plate 62 or 63 and the adjacent intermediate plate 41. The connectors 34 and 36 are fastened to the center of end plates 62 and 63, respectively. A letter designation *a, b, c . . . n* is given for adjacent shunt and series resistors in the respective pads.

Network 33 slidably fits into casing 10. The V-shaped rods support network 33 within casing 10 and electrically connect the shunt resistors to casing 10.

Figure 5:
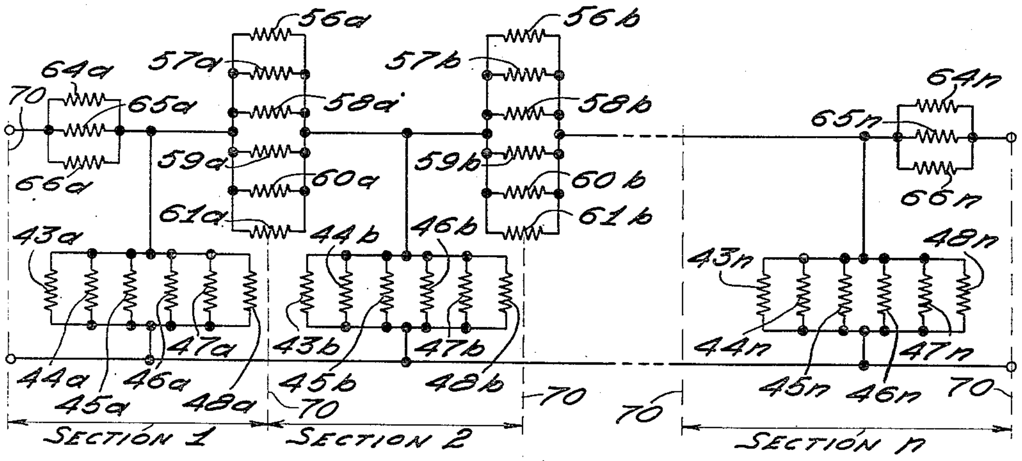
Figure 5 is a schematic view of the embodiment.

The embodiment in Figure 4 shows a network with six shunt resistors in parallel and six series resistors in parallel per pad. Any number of symmetrically disposed resistors may be used as long as their parallel combination equals the required series and shunt resistances for each section. Figure 5 shows schematically the paralleled resistors.

It is apparent that the power rating of a section increases with the number of parallel resistances used. For example, a 250 ohm shunt resistance can be obtained by one two-watt carbon resistor or six 1500 ohm two-watt resistors in parallel. It is obvious that the 250 ohm resistance obtained by the parallel combination has substantially six times the power dissipation rating of the single 250 ohm resistance. The use of resistors in parallel produces structural symmetry.

The amount of power dissipated by each resistor is increased many times by the moving liquid 32. Liquid 32 may be pumped in either direction because each resistor dissipates an equal amount of power.

Figure 6:
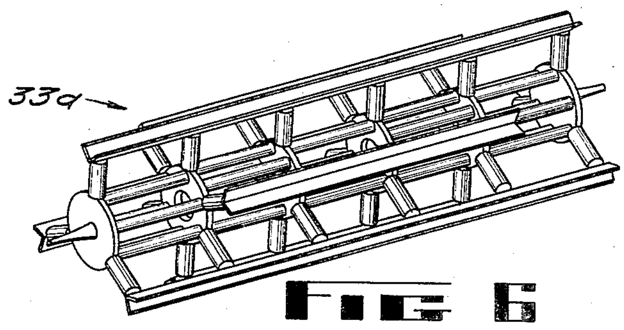
Figure 6 illustrates the end section of a pi connected attenuator.
Figure 7:
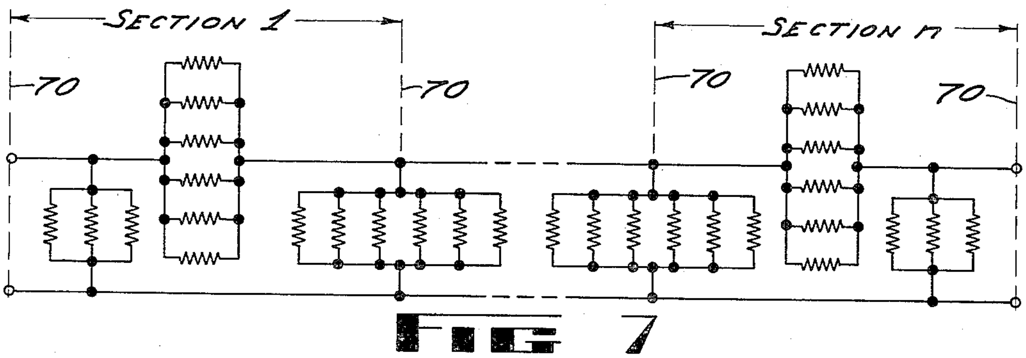
Figure 7 illustrates schematically the pi sections of Figure 6.

Network 33 could as easily be made with pi sections as with T sections. Figures 6 and 7 show a pi ladder network 33*a* which is structurally similar to the T ladder network in Figures 4 and 5. The only difference is in the terminating resistors. In a T network, the terminating series resistance has one-half the value of the adjacent intermediate series resistance. In a pi network, the terminating shunt resistance has twice the value of the adjacent intermediate shunt resistance. The connecting series resistors in adjacent T sections are combined in Figure 5 for ease of construction. The connecting shunt resistances in adjacent pi sections are likewise combined in Figure 7 for ease of construction. The dotted lines 70 in Figures 5 and 7 separate the sections of the network.

This invention requires that the following formula express the attenuation for any section in the network:

$$D_n = 10 \log_{10} \frac{P_{in}-(n-1)L}{P_{in}-nL}$$

and $$\text{Highest } n = \frac{P_{in}}{L}$$

where $D_n$ is attenuation in decibels for the $n$th section, $P_{in}$ is the input power to the network, $n$ is the numerical designation of the section in the direction of power flow, and L is the power dissipated per section.

Figure 8:
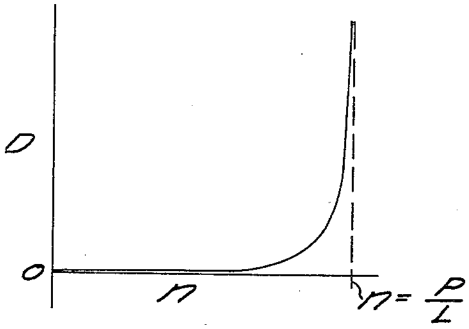
Figure 8 is a diagram which illustrates the variation of exponential attenuation per section in this invention; and, Figure 9 is a diagram which compares the power dissipated in the series resistance of a section to the power dissipated in the shunt resistance of that section as a function of the exponential attenuation across the section.

The variation of attenuation per section ($D_n$) with the number of the section ($n$) is shown in Figure 8. The first section has a very small attenuation which is near zero decibels. Attenuation increases in a nonlinear manner as the integer $n$ increases, and attenuation approaches infinity when $$n = \frac{P_{in}}{L}$$

The approach of $D_n$ to infinity does not interfere with the operation of the device in practice, however, because an infinite attenuation for the last section merely means that it dissipates all of the power that it receives, which is L watts. In practice, it is not desirable to have complete power dissipation in the last section. One or two watts output is often required to operate instruments. The model of this invention which attenuated 10,000 watts to two watts in 125 sections required an attenuation of 16.9 decibels for the last section. The attenuation for the next to last section was three decibels, and the attenuation for the first section was 0.03447 decibel.

Where the attenuator is used solely as a load, it is not necessary to have total dissipation in the last section because the remaining one or two watts is reflected and attenuated to almost nothing before it can reach the input.

The series and shunt resistances required for each section of a ladder network are determined by the following formulae:

For a T network, the series resistance for the $n$th section is:

$$Z_e = 2Z_0 \tanh \frac{\theta_n}{2}$$

and the shunt resistance for the $n$th section is:

$$Z_h = \frac{Z_0}{\sinh \theta_n}$$

For a pi network the series resistance for the $n$th section is:

$$Z_e = Z_0 \sinh \theta_n$$

and the shunt resistance for the $n$th section is:

$$Z_h = \frac{Z_0}{2 \tanh \frac{\theta_n}{2}}$$

where $Z_e$ is the total series resistance for a section, $Z_h$ is the total shunt resistance for a section, $Z_0$ is the characteristic impedance of the input and output lines, and $\theta_n$ is the attenuation in nepers for the section. One neper is, of course, equal to 8.686 decibels.

Therefore, in a T network having paralleled resistors similar to that shown in Figure 5, the value of each series resistor in the $n$th section is:

$$Z_S = 2SZ_0 \tanh 0.058D_n$$

where $Z_S$ is the resistance per series resistor in the $n$th section, and S is the number of series resistors connected in parallel in the $n$th section. And the value of each shunt resistor in the $n$th section is:

$$Z_R = \frac{RZ_0}{\sinh 0.115Dn}$$

where R is the number of parallel shunt resistors per section.

In a pi network, similar to that shown in Figure 7, the value of each series resistor in the $n$th section is:

$$Z_S = SZ_0 \sinh 0.115D_n$$

and the value of each shunt resistor in the $n$th section is:

$$Z_R = \frac{RZ_0}{2 \tanh 0.058Dn}$$

Figure 9:
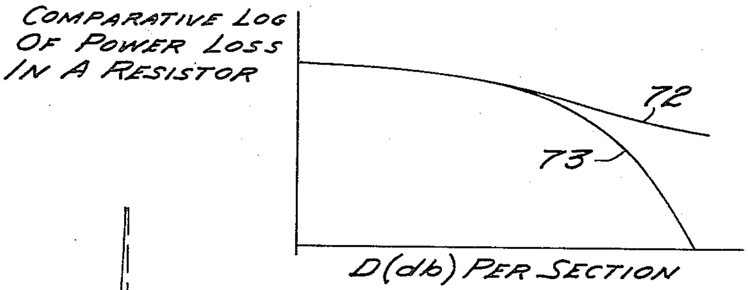

Figure 9 compares the power dissipated by the series resistance of a section to the power dissipated by the shunt resistance of that section as a function of the attenuation across the section in decibels. Curve 72 represents the power dissipation in series resistors, and curve 73 represents the power distribution in shunt resistors. The relative magnitudes of the ordinates of curves 72 and 73 at a given decibel attenuation provide a comparison of the power distribution in the series and shunt resistances for a section with that attenuation. It is seen that power dissipation in a section is virtually equally distributed between its series and shunt resistances for attenuations below approximately 20 decibels. In the above mentioned model it was not found necessary to vary the attenuation above 17 decibels. It is therefore not believed necessary to go above 20 decibels for the last section of a network except in exceptional cases. More parallel resistors may be used to maintain a uniform power loss per resistor if a higher attenuation than 20 decibels is desired.

Power dissipation within the attenuator may easily be calibrated from well known heat loss formulae with data obtained from rate of flow meter 28 and thermometers 21 and 22. The specific heat of the coolant must, of course, be known.

It is therefore apparent that this invention extends ladder networks to heretofore impossible high energy dissipation uses at ultra high frequencies. The invention allows a high power ladder network to be made from common, inexpensive and physically small components.

The frequency range of this invention is greater than for any known high power attenuator and a phenomenally low standing wave ratio was obtained for all frequencies from zero to over 1000 megacycles. The model provided a standing wave ratio of approximately 1.2 to 1 for the frequencies from zero to about 500 megacycles. The standing wave ratio then increased to approximately 1.8 to 1 at approximately 1,000 megacycles. The invention therefore has a very good impedance match throughout the most used part of the spectrum, and a single embodiment has extraordinary adaptability.

Although this invention has been described with respect to particular embodiments thereof, it is not to be so limited, as changes and modifications may be made therein which are within the full intended scope of the invention, as defined by the appended claims.

We claim:

1. A high power ladder network comprising, a series of T resistor sections connected in series with the exponential attenuation across each T section defined by the formula:

$$D_n=10\log_{10}\frac{P_{in}-(n-1)L}{P_{in}-nL}$$

where $D_n$ is the attenuation in decibels across the $n$th T section, $n$ is the number of the T section numbered consecutively from one at the input end, $P_{in}$ is the input power to the ladder network, and L is the power loss per T section in watts; the shunt impedance $Z_n$ per T section being defined by the formula:

$$Z_n=\frac{Z_0}{\sinh\theta_n}$$

where $Z_0$ is the characteristic impedance of the network, and $\theta_n$ is the attenuation across the $n$th T section in nepers; and the total series impedance $Z_e$ per T section is defined by the formula:

$$Z_e=2Z_0\tanh\frac{\theta_n}{2}$$

2. A high power ladder network comprising, a series of pi resistor sections connected in series with the exponential attenuation across each pi section defined by the formula:

$$D_n=10\log_{10}\frac{P_{in}-(n-1)L}{P_{in}-nL}$$

where $D_n$ is the attenuation in decibels across the $n$th pi section, $n$ is the number of the pi section numbered consecutively from one at the input end, $P_{in}$ is the input power to the ladder network, and L is the power loss per pi section in watts; the shunt impedance per pi section is defined by the formula:

$$Z_h=\frac{Z_0}{2\tanh\frac{\theta_n}{2}}$$

where $Z_h$ is the shunt impedance of the $n$th pi section, $Z_0$ is the characteristic impedance of the network, and $\theta_n$ is the attenuation across the $n$th pi section in nepers; and the total series impedance per pi section is defined by the formula:

$$Z_e=Z_0\sinh\theta_n$$

where $Z_e$ is the total series impedance for the $n$th pi section.

3. A high power ladder network comprising, a series of T resistor sections connected in series with the exponential attenuation across each T section defined by the formula:

$$D_n=10\log_{10}\frac{P_{in}-(n-1)L}{P_{in}-nL}$$

where $D_n$ is the attenuation in decibels across the $n$th T section, $n$ is the number of the T section numbered consecutively from one at the input end, $P_{in}$ is the input power to the ladder network, and L is the power loss per T section in watts; a plurality of transversely arranged resistors connected in parallel to form the shunt impedance per section which is defined by the formula:

$$Z_h=\frac{Z_0}{\sinh\theta_n}$$

where $Z_h$ is the total shunt impedance for the $n$th T section, $Z_0$ is the characteristic impedance of the network, and $\theta_n$ is the attenuation across the nth section in nepers; a plurality of longitudinally arranged resistors connected in parallel to one end of said shunt resistors to form the series impedance per section which is defined by the formula:

$$Z_e=2Z_0\tanh\frac{\theta_n}{2}$$

where $Z_e$ is the total series impedance per T section.

4. A high power ladder network comprising, a series of pi resistor sections connected in series with the exponential attenuation across each pi section defined by the formula:

$$D_n=10\log_{10}\frac{P_{in}-(n-1)L}{P_{in}-nL}$$

where $D_n$ is the attenuation in decibels across the $n$th pi section, $n$ is the number of the pi section numbered consecutively from one at the input end, $P_{in}$ is the input power to the ladder network, and L is the power loss per section in watts; a plurality of transversely arranged resistors connected in parallel to form the shunt impedance which is defined by the formula:

$$Z_h=\frac{Z_0}{2\tanh\frac{\theta_n}{2}}$$

where $Z_h$ is the total shunt impedance of the $n$th pi section, $Z_0$ is the characteristic impedance of the network, and $\theta_n$ is the attenuation across the $n$th section in nepers; a plurality of axially arranged resistors connected in parallel between adjacent shunt resistors to form the series impedance per section which is defined by the formula:

$$Z_e=Z_0\sinh\theta_n$$

where $Z_e$ is the total series impedance per pi section.

5. A high power ladder network comprising, a plurality of plates axially spaced, a series of T pad sections connected in series and supported by said plates, R number of shunt resistors connected in parallel to provide the shunt resistance of a section, said R shunt resistors connected at an inner end to said plates and the resistance of each shunt resistor in any section determined by the formula:

$$Z_R=\frac{RZ_0}{\sinh 0.115D_n}$$

where $Z_R$ is the resistance per shunt resistor in the $n$th pad section, $Z_0$ is the characteristic impedance of the ladder network, R is the number of shunt resistors per section, and $D_n$ is the exponential attenuation for the $n$th section; conducting means connected to the other ends of said shunt resistors; S number of series resistors connected in parallel to provide the series resistance of a section, said S series resistors connected between adjacent plates and the resistance of each series resistor in any section determined by the formula:

$$Z_S=2SZ_0\tanh 0.058D_n$$

where $Z_S$ is the resistance per series resistor in the $n$th section, $Z_0$ is the characteristic impedance of the network, S is the number of series resistors in the $n$th section, and $D_n$ is the exponential attenuation of the $n$th section and is determined by the following formula:

$$D_n=10\log_{10}\frac{P_{in}-(n-1)L}{P_{in}-nL}$$

where $D_n$ is the attenuation in decibels across the $n$th section, $n$ is the number of the section numbered consecutively from the first section at the input end, $P_{in}$ is the input power to the ladder network, and L is the power loss per section in watts, and the last section having a value of $D_n$ that is many times greater than the value of $D_n$ for the second last section, the first resistance unit in the first pad is a series group of parallel resistors connected at one end to the first plate, and power input means connected between the other end of said first series resistor group and said conducting means.

6. A high power ladder network comprising, a plurality of plates axially spaced, a plurality of pi pad sections connected in tandem and supported by said plates, R number of shunt resistors connected in parallel to provide the shunt resistance of a section, said R shunt resistors connected at an inner end to said plates and the resistance of a shunt resistor determined by the formula:

$$Z_R=\frac{RZ_0}{2\tanh 0.058D_n}$$

where $Z_R$ is the resistance per shunt resistor in the $n$th section, $Z_0$ is the characteristic impedance of the network, R is the number of shunt resistors in each section, and $D_n$ is the exponential attenuation for the $n$th section; conducting means connected to the other end of said shunt resistors; S number of series resistors connected in parallel to provide the series resistance of a section, said S series resistors connected in parallel between plates and the resistance of each series resistor in any section is determined by the formula:

$$Z_s=SZ_0\sinh 0.115D_n$$

where $Z_S$ is the resistance per series resistor, $Z_0$ is the characteristic impedance of the network, S is the number of series resistors in each section, and $D_n$ is the exponential attenuation per section and is determined by the formula:

$$D_n=10\log_{10}\frac{P_{in}-(n-1)L}{P_{in}-nL}$$

where $D_n$ is the attenuation in decibels across the $n$th section, $n$ is the number of the section numbered consecutively from one at the input end, $P_{in}$ is the input power to the ladder network, and L is the power loss per section in watts; the first resistance unit of said first pad in said network is a shunt group of resistors connected between the first plate and said conducting means, power input means connected across said first shunt resistance, and the last section has a finite value for $D_n$ that is substantially greater than the value of $D_n$ for the second last section.

7. A high power ladder network comprising, a plurality of plates axially spaced, a series of T pad sections connected in tandem, a plurality of shunt resistors connected in parallel to provide the shunt resistance for a section, said shunt resistors connected at one end to a plate and the resistance of each shunt resistor determined by the formula:

$$Z_R=\frac{RZ_0}{\sinh 0.115D_n}$$

where $Z_R$ is the resistance per shunt resistor in the $n$th section, $Z_0$ is the characteristic impedance of the network, R is the number of shunt resistors per section, and $D_n$ is the exponential attenuation per section and is determined by the following formula:

$$D_n=10\log\frac{P_{in}-(n-1)L}{P_{in}-nL}$$

where $D_n$ is the attenuation in decibels across the $n$th section, $n$ is the number of the section numbered consecutively from the first section at the input end, $P_{in}$ is the input power to the ladder network, and L is the power loss per section in watts, the last section has a finite exponential attenuation, a plurality of series resistors connected in parallel to provide the series resistance for a section, said series resistors connected between adjacent plates and determined by the formula $$Z_S=2SZ_0\tanh 0.058D_n$$

where $Z_S$ is the resistance per series resistor in the $n$th section, and S is the number of series resistors in parallel per section; conducting means connected to the other side of said shunt resistors; said ladder network terminated at each end by a group of parallel resistors with one end connected to the first and last plates, respectively, a pair of end plates connected to the other ends of the terminating resistors, respectively, a connector connected to each of said end plates, and a casing enclosing said ladder network and the outer ends of said shunt resistors electrically connected to the inner surface of said casing.

8. A high power ladder network comprising, a plurality of plates axially spaced, a plurality of T pad sections connected in tandem and supported at their inner portions by said plates, a plurality of shunt resistors connected in parallel as the shunt resistance of a section, said shunt resistors connected at an inner end to said plates and radially extending therefrom, and the resistance of a shunt resistor determined by the formula:

$$Z_R=\frac{RZ_0}{\sinh 0.115D_n}$$

where $Z_R$ is the resistance per shunt resistor in the $n$th section, $Z_0$ is the characteristic impedance of the network, R is the number of shunt resistors per section, and $D_n$ is the exponential attenuation for the section; conductor rods connected to the other ends of said shunt resistors; a plurality of series resistors connected in parallel as the series resistance of a section, said series resistors connected between said plates in a symmetrical manner, and the resistance of each series resistor determined by the formula:

$$Z_S=2SZ_0\tanh 0.058D_n$$

where $Z_S$ is the resistance per series resistor in the $n$th section, $Z_0$ is the characteristic impedance of the network, S is the number of series resistors in parallel per section, and $D_n$ is the exponential attenuation for each section and is determined by the formula:

$$D_n=10\log_{10}\frac{P_{in}-(n-1)L}{P_{in}-nL}$$

where $D_n$ is the attenuation in decibels across the $n$th section, $n$ is the number of the section numbered consecutively from one at the input end, $P_{in}$ is the input power to the ladder network, and L is the power loss per section in watts; the last network section has an exponential attenuation that is finite; $S/2$ number of terminal series resistors connected in parallel having one of their ends connected to the first shunt resistors of said ladder network, another $S/2$ number of terminal series resistors connected in parallel having one of their ends connected to the last shunt resistors, a pair of connectors connected to the other ends of said terminal resistors, respectively, and a casing surrounding said conductor rods of said ladder network with said rods electrically contacting the inner surface of said casing.

9. A high power ladder network comprising, a plurality of plates longitudinally spaced, a series of T pad sections connected in tandem and supported at their inner portion by said plates, a plurality of shunt resistors connected in parallel groups and each group connected at its inner end to one of said plates, and the resistance of each shunt resistor determined by the formula:

$$Z_R=\frac{RZ_0}{\sinh 0.115D_n}$$

where $Z_R$ is the resistance per shunt resistor in the $n$th section, $Z_0$ is the characteristic impedance of the network, R is the number of shunt resistors in parallel per section, and $D_n$ is the attenuation in decibels across the $n$th section; conducting rods connected to the outer ends of said shunt resistors; a plurality of series resistors connected in parallel groups between adjacent plates and symmetrically arranged, and the resistance of each series resistor determined by the formula $Z_S=2SZ_0 \tanh 0.058D_n$ where $Z_S$ is the resistance per series resistor in the $n$th section, $Z_0$ is the characteristic impedance of the network, S is the number of series resistors per section, and $D_n$ is the exponential attenuation per section and is determined by the following formula:

$$D_n=10 \log_{10} \frac{P_{in}-(n-1)L}{P_{in}-nL}$$

where $D_n$ is the attenuation in decibels across the $n$th section, $n$ is the number of the section numbered consecutively from the first section at the input end, $P_{in}$ is the input power to the ladder network, and L is the power loss per section in watts, the last section has a finite exponential attenuation that is substantially greater than the attenuation of the second last section, said ladder network is terminated at each end by $S/2$ number of series resistors connected in parallel, a pair of end plates connected to the outer ends of the terminating series resistors, respectively, a pair of connectors connected to the other sides of said end plates, respectively; a cylindrical casing enclosing and supporting said ladder network with said rods electrically contacting the inner surface of said casing, a pair of thin insulating sheets fixed to the ends, respectively, of said casing with said connectors projecting through said sheets and said sheets forming a fluid tight seal, pipes coupled to said casing adjacent said sheets, respectively, a pair of thermometers supported through said casing near said sheets, respectively; and a dielectric fluid coolant contained within said pipes and casing and circulated through said ladder network.

References Cited in the file of this patent

UNITED STATES PATENTS

| | | |
|---|---|---|
| 2,286,029 | Van Beuren | June 9, 1942 |
| 2,539,352 | Hewlett | Jan. 23, 1951 |

FOREIGN PATENTS

| | | |
|---|---|---|
| 968,752 | France | Dec. 5, 1950 |

OTHER REFERENCES

"Reference Data for Radio Engineers," 3rd edition, Federal Telephone and Radio Corporation, pp. 153–164. (Copy in Div. 69.)